United States Patent
V et al.

(10) Patent No.: US 12,411,058 B2
(45) Date of Patent: Sep. 9, 2025

(54) METHOD AND APPARATUS FOR ALIGNING LENS ASSEMBLY OF CAMERA

(71) Applicant: E-CON SYSTEMS INDIA PRIVATE LIMITED., Chennai (IN)

(72) Inventors: Nandagopalan V, Chennai (IN); Pavithra S, Chennai (IN)

(73) Assignee: E-CON SYSTEMS INDIA PRIVATE LIMITED., Chennai (IN)

( * ) Notice: Subject to any disclaimer, the term of this patent is extended or adjusted under 35 U.S.C. 154(b) by 417 days.

(21) Appl. No.: 18/178,011

(22) Filed: Mar. 3, 2023

(65) Prior Publication Data

US 2024/0295462 A1    Sep. 5, 2024

(51) Int. Cl.
*G01M 11/02*    (2006.01)

(52) U.S. Cl.
CPC .... *G01M 11/0264* (2013.01); *G01M 11/0292* (2013.01)

(58) Field of Classification Search
CPC ....... G02B 2027/0178; G02B 27/0172; G01M 11/0264; G01M 11/0292
See application file for complete search history.

(56) References Cited

U.S. PATENT DOCUMENTS

| | | | |
|---|---|---|---|
| 2014/0267623 A1* | 9/2014 | Bridges | G06T 7/70 348/46 |
| 2019/0150717 A1* | 5/2019 | Lu | A61B 5/0031 |
| 2024/0160023 A1* | 5/2024 | Park | G02B 27/0172 |

OTHER PUBLICATIONS

Sami, Calculating the modulation transfer function of an optical imaging system incorporating a digital camera from slanted-edge images captured under variable illumination levels: Fourier transforms application using MATLAB, 2016. (Year: 2016).*
Kraczek, non iterative multi-aperture and multi-illuminator phasing for high resolution coherent imaging, 2017 (Year: 2017).*
Li et al., Measurement of the Modulation Transfer Function of Infrared Imaging System by Modified Slant Edge Method, 2016. (Year : 2016).*
Kadiev, Using the Modulation Transfer Function as a Metric for Lens Sharpness, 2020. (Year: 2020).*

* cited by examiner

*Primary Examiner* — Mohammad K Islam
(74) *Attorney, Agent, or Firm* — Sage Patent Group

(57) ABSTRACT

Embodiments of the present disclosure provide a method for aligning a lens assembly of a camera. The method is performed by an image processor of the camera. The method includes obtaining at least one image frame being captured by the camera. The method includes determining at least one slant edge spread over at least one region of at least one image frame by analyzing each image frame. The method includes estimating contrast variations in the at least one slant edge spread over the at least one region of the at least one image frame using Modulation Transfer Function (MTF). The method includes aligning the lens assembly of the camera in accordance with the estimated contrast variations in the at least one slant edge spread over the at least one region of the at least one image frame.

19 Claims, 8 Drawing Sheets

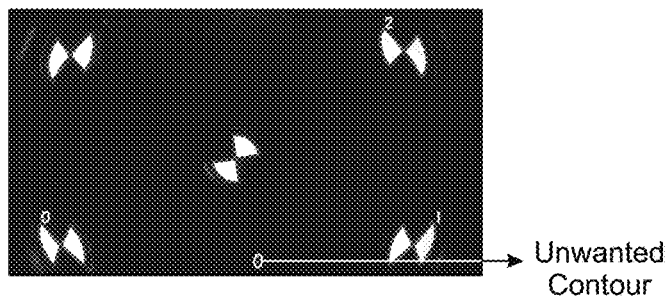
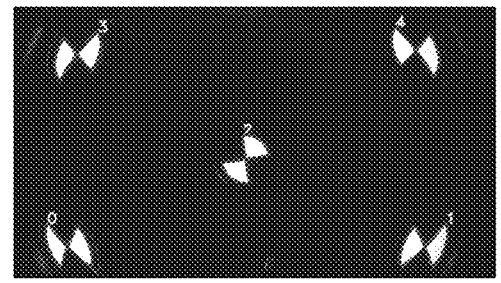
FIG. 7A    FIG. 7B
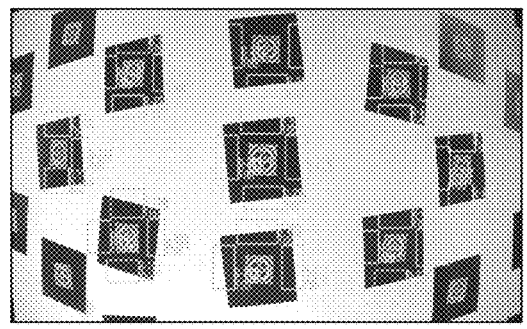
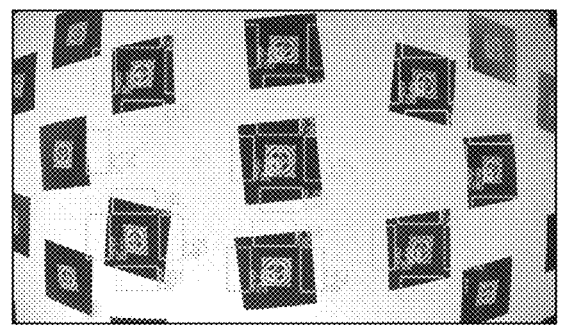
FIG. 8A    FIG. 8B

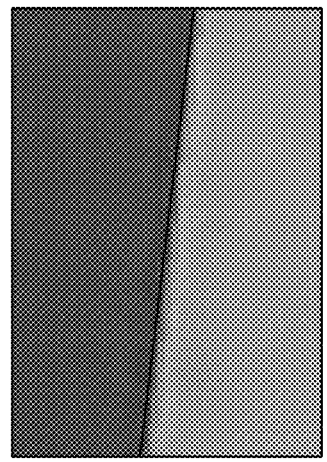
FIG. 9
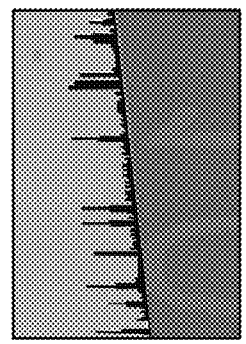 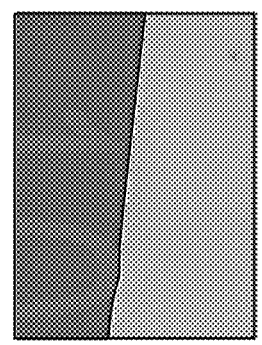
FIG. 10A            FIG. 10B

METHOD AND APPARATUS FOR ALIGNING LENS ASSEMBLY OF CAMERA

TECHNICAL FIELD

The present application relates generally to the field of camera lens assembly, and more specifically to aligning a lens assembly of a camera while achieving a minimum and maximum focus range of the camera.

INTRODUCTION

Generally, in a camera, for example, a fixed focus camera, a lens assembly has to be aligned at a distance, which provides a clearest and sharpest/focused image all over the minimum and maximum working distance known as a focus range of the camera.

In the prior art, the lens assembly of the camera can be aligned by analyzing contrast variations of an image being captured by the camera. For example, the contrast variations of the image identify black and white variations of the image. For aligning the lens assembly, the image captured from the camera is fed to an application. The application converts the image into black and white and calculates the black and white variations of the image as a Standard Deviation value. The application then analyzes the calculated Standard Deviation value with respect to a fixed Standard Deviation range for aligning the lens assembly. However, the fixed Standard Deviation range can be provided by checking a fixed number of cameras, so that in few lens assemblies, which achieve the fixed range may not provide the required minimum and maximum working distance. Also, the Standard Deviation value is calculated using multiple test charts, for example, Siemens star charts, positioned in both the minimum and maximum working distance. Thus, aligning the lens assembly of the camera according to the prior art increases processing time.

In addition, a rotation of the lens assembly (for example, 0.2 degree of rotation) may also affect the required minimum and maximum working distance, since the black and white variations of the image are not calculated by considering operating parameters related to the lens assembly.

SUMMARY

Exemplary embodiments include a method for aligning a lens assembly of a camera. The method comprises obtaining, by an image processor, at least one image frame being captured by the camera. The method comprises determining, by the image processor, at least one slant edge spread over at least one region of the at least one image frame by analyzing each image frame, wherein the at least one slant edge defines a contrast of the at least one image frame and the at least one region being comprising at least one template or at least one contour of a test chart. The method comprises estimating, by the image processor, contrast variations in the at least one slant edge spread over the at least one region of the at least one image frame using Modulation Transfer Function (MTF), wherein the contrast variations in the at least one slant edge identify a black and white transition in the at least one image frame. The method comprises aligning, by the image processor, the lens assembly of the camera in accordance with the estimated contrast variations in the at least one slant edge spread over the at least one region of the at least one image frame.

Advantageously, the contrast variations estimated using MTF may be maximum contrast variations, which may be used to align the lens assembly of the camera instead of comparing MTF values with respect to a fixed range (as disclosed in the prior art). As a result, the lens assembly may be aligned efficiently by controlling any deviations from a required minimum and maximum working distance of the camera. In addition, processing time may also be reduced.

In some embodiments, each image frame is captured while the lens assembly of the camera is being adjusted and a resolution of the camera is set to a pre-defined resolution. Thus, a minute variation in rotation of the lens assembly may be considered while aligning the lens assembly of the camera, which further provides the exact required working distance of the camera.

In some embodiments, the step of obtaining the at least one image frame comprises calculating a mean of pixel values in the at least one image frame being captured by the camera. The method comprises determining whether the mean of pixel values in the at least one image frame is greater than a pre-defined pixel threshold. The method comprises obtaining the at least one image frame, when the mean of pixel values in the at least one image frame is greater than a pre-defined pixel threshold.

In some embodiments, the method further comprises rejecting the at least one image frame, when the mean of pixel values in the at least one image frame is not greater than the pre-defined pixel threshold. Thus, only a non-blur image may be considered for further analysis.

In some embodiments, the step of determining the at least one slant edge spread over the at least one region of the at least one image frame comprises identifying at least one region of interest (ROI) in the at least one image frame by performing template matching or contour detection on each image frame, wherein the at least one ROI in the at least one image frame is the region of the at least one image frame comprising the at least one slant edge. The method comprises altering the identified at least one ROI in the at least one image frame. The method comprises determining the at least one slant edge spread over the altered at least one ROI in the at least one image frame.

Thus, the at least one slant edge may be detected automatically without involving any manual interpretation. Auto-detection of the at least one slant edge spread over the at least one region in the at least one image frame may save time taken for selecting each region of the image frame manually. In addition, a single chart (either the SFR plus chart or a SFR reg chart) may be used for the slant edge detection/MTF calculation.

In some embodiments, the step of identifying the at least one ROI in the at least one image frame by performing template matching or contour detection comprises determining whether a Spatial Frequency Response (SFR) plus chart or a SFR reg chart is selected based on a field of view (FOV) of the lens assembly for identifying the at least one ROI in the at least one image frame, wherein the SFR plus chart or the SFR reg chart is the test chart. When it has been determined that the SFR plus chart is selected, the method comprises identifying the at least one ROI in the at least one image frame by performing template matching.

In some embodiments, when it has been determined that the SFR reg chart is selected, the method comprises identifying the at least one ROI in the at least one image frame by performing contour detection.

In some embodiments, the step of identifying the at least one ROI in the at least one image frame by performing template matching comprises selecting a template representing at least one pattern being present in the SFR plus chart. The method comprises determining at least one location in the at least one image frame comprising the selected template. The method comprises identifying the determined at least one location in the at least one image frame as the at least one ROI in the at least one image frame.

In some embodiments, the step of determining the at least one location in the at least one image frame comprising the selected template comprises detecting a first location in the at least one image frame comprising the selected template and blocking an area around the first location for identifying at least one subsequent location in the at least one image frame comprising the selected template.

In some embodiments, the step of identifying the at least one ROI in the at least one image frame by performing contour detection comprises detecting at least one contour in at least one location in the at least one image frame, wherein the at least one contour is being present in the SFR reg chart. The method comprises fitting a rectangle around the detected at least one contour. The method comprises calculating a height and a width of the rectangle fitted around the at least one contour. The method comprises assigning a contour threshold for the height and the width of the rectangle fitted around the at least one contour. The method comprises identifying the at least one location associated with the at least one contour as the at least one ROI in the at least one image frame, when the height and the width of the rectangle fitted around the at least one contour is greater than the contour threshold.

In some embodiments, the method further comprises rejecting the at least one contour when the height and the width of the rectangle fitted around the at least one contour is not greater than the contour threshold.

In some embodiments, the step of altering the at least one ROI in the at least one image frame comprises one or more of: cropping a size of the at least one ROI based on a curvature of the lens assembly of the camera; and rotating the at least one ROI for a vertical alignment, when the at least one ROI is a horizontal ROI.

In some embodiments, the step of determining the at least one slant edge spread over the altered at least one ROI in the at least one image frame comprises cancelling the noise in the altered at least one ROI, and determining the at least one slant edge spread over the altered at least one ROI. Advantageously, cancelling the noise improves slant edge detection.

In some embodiments, the step of estimating the contrast variations in the at least one slant edge using MTF comprises fitting the at least one slant edge spread over the at least one region of the at least one image frame as a straight edge. The method comprises calculating an Edge Spread Function (ESF) by projecting edge points horizontally, wherein the edge points represent a pixel value in the at least one slant edge. The method comprises deriving a Line Spread Function (LSF) by determining a difference of the edge points in the ESF. The method comprises applying a Discrete Fourier Transform (DFT) on the LSF, wherein a magnitude of the DFT represents a MTF value.

In some embodiments, the method further comprises calculating the MTF value to a maximum MTF, wherein the maximum MTF represents the contrast variations in the at least one slant edge spread over the at least one region of the at least one image frame.

In some embodiments, the step of calculating the MTF value to the maximum MTF comprises rotating the lens assembly of the camera in a clockwise direction to enable the MTF value to achieve the maximum MTF from a lower value. When the MTF value decreases from the maximum MTF, rotating the lens assembly of the camera in a counter-clockwise direction until the MTF value is computed to the maximum MTF achieved during rotation of the lens assembly of the camera in the clockwise direction. Thus, calculation of the maximum MTF may be more accurate that is minor variations in the working distance of the camera may be identified efficiently.

In some embodiments, the step of aligning the lens assembly of the camera comprises aligning the lens assembly of the camera while achieving a minimum and maximum focus range of the camera.

Exemplary embodiments include a camera comprising a lens assembly, an imaging element configured to be coupled to the lens assembly for capturing at least one image, and an image processor configured to be coupled to the lens assembly. The image processor is configured for obtaining at least one image frame. The image processor is configured for determining at least one slant edge spread over at least one region of the at least one image frame by analyzing each image frame, wherein the at least one slant edge defines a contrast of the at least one image frame and the at least one region being comprising at least one template or at least one contour of a test chart. The image processor is configured for estimating contrast variations in the at least one slant edge spread over the at least one region of the at least one image frame using Modulation Transfer Function (MTF), wherein the contrast variations in the at least one slant edge identify a black and white transition in the at least one image frame. The image processor is configured for aligning the lens assembly of the camera in accordance with the estimated contrast variations in the at least one slant edge spread over the at least one region of the at least one image frame.

Exemplary embodiments include a computer program product comprising a non-transitory computer readable medium, having thereon a computer program comprising program instructions. The computer program is loadable into a data processing unit and configured to cause execution of the above-described method when the computer program is run by the data processing unit.

These and other objects, features, and advantages of embodiments of the present disclosure will become apparent upon reading the following Detailed Description in view of the Drawings briefly described below.

BRIEF DESCRIPTION OF THE DRAWINGS

FIGS. 7A and 7B show contour detection performed for identifying at least one ROI in an image frame, according to some embodiments;

FIGS. 8A and 8B show cropping of a ROI in an image frame, according to some embodiments;

FIG. 9 shows a slant edge spread over at least one region of an image frame, according to some embodiments;

FIGS. 10A and 10B show fitting of a slant edge as a straight edge for MFT calculation, according to some embodiments.

DETAILED DESCRIPTION

Figure 1:
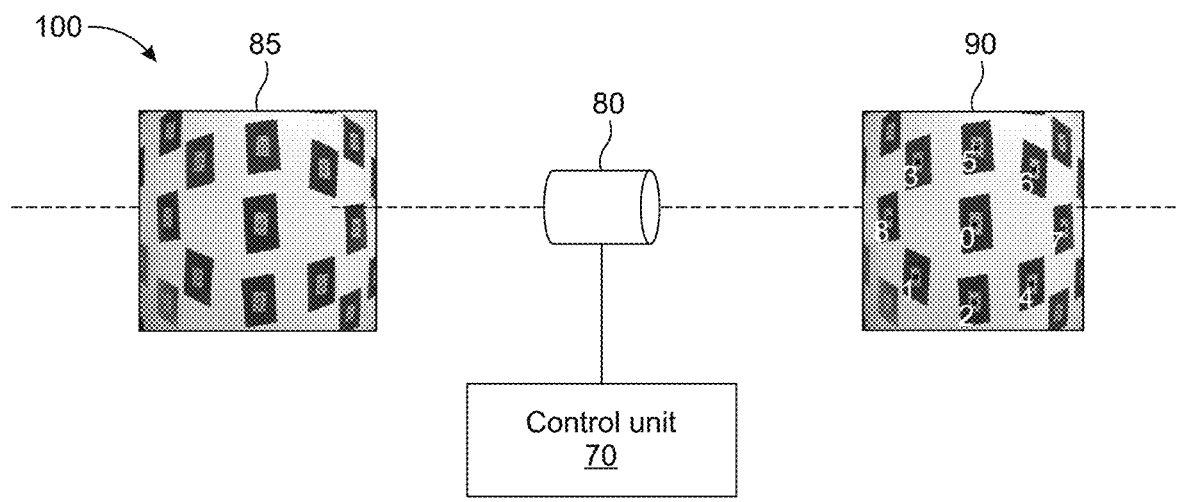
FIG. 1 discloses an exemplary camera in which embodiments of the present disclosure may be implemented.

The embodiments herein, the various features, and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The terminology used herein is for the purpose of describing particular aspects of the disclosure only, and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the examples set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. Referring now to the drawings, and more particularly to FIGS. 1 through 11, where similar reference characters denote corresponding features consistently throughout the figures, there are shown preferred embodiments.

FIG. 1 discloses an exemplary camera 100 in which embodiments of the present disclosure may be implemented. The camera 100 referred herein may be any imaging device configured to capture an image frame/image. Examples of the image frame may include, but is not limited to, a motion picture, a still picture, and so on. In some examples, the camera 100 may be used as standalone device. In some examples, the camera 100 may be integrated or incorporated into various types of electronic devices. Examples of the electronic devices may include, but are not limited to, a mobile, a tablet, a computer, a wearable computing device, a portable consumer electronics equipment, and so on. In some embodiments, the camera 100 referred herein may be a fixed-focus camera.

As depicted in FIG. 1, the camera 100 includes a test chart 85, a lens assembly 80, an imaging element 90, and a control unit 70.

The test chart 85 referred herein may comprise patterns/graphical objects (also be referred to as reference markings or reference patterns) disposed at pre-determined respective positions. Each of the pattern may have a specific geometric shape and being arranged in a pre-determined orientation relative to other one or more patterns in the test chart. For example, a pair of the patterns may be arranged in a vertical orientation, a horizontal orientation, along a diagonal direction, along a direction having an inclination different from 45 degrees with respect to a base of the test chart 85, or the like. In some examples, the test chart 85 may include a Spatial Frequency Response (SFR) chart, a SFR reg chart, and so on. An image of the fixed set of patterns of the test chart 85 may be generated by the camera 100 for a respective arrangement of the lens assembly 80 relative to the imaging element 90 thereof.

The lens assembly 80 referred herein may include one or more lenses. In some examples, the one or more lenses may be embodied in or may include solid-state lenses formed from glass or other transparent or semi-transparent materials, and/or liquids contained in a suitable solid casing. In some examples, the lens assembly may have fixed wide variety of one or more lenses with Field of View (FOV) regions visible to the camera 100, for example, ranging from 20 degrees to 200 degrees. In some examples, the one or more lenses may include narrow angles based lenses, wider angle based lenses, or the like. The lens assembly 80 may be configured to receive light reflected off a surface of the test chart 85 and focus at least a portion of the received light onto the imaging element 90, which generates the image frame/image data.

The imaging element 90 may be configured to generate imaging signals/electric signal and/or the image frame/image data. In some examples, the imaging element 90 may include at least one of, but is not limited to, an image sensor, optical elements, an array/one or more of photosensitive elements, or the like. In some examples, each of the photosensitive elements may be referred to as a pixel sensor or a pixel. In response to light focused by the lens assembly 80, the imaging element 90 may generate the image frame. The image frame referred herein may be a representative of an image of the test chart 85. The image data generated by the imaging element 90 may depend on a distance between the lens assembly 80 and the imaging element 90.

The control unit/controller 70 referred herein may be functionally coupled, for example, communicatively coupled, electrically coupled, mechanically coupled, and/or electro mechanically coupled, to the lens assembly 80. The control unit 70 is configured to align the lens assembly 80 of the camera 100.

According to embodiments disclosed herein, the control unit 70 obtains at least one image frame being captured by the camera 100 using the imaging element 90. The control unit 70 determines at least one slant edge spread over at least one region of the at least one image frame by analyzing each image frame, wherein the at least one slant edge defines a contrast of the at least one image frame and the at least one region being comprising at least one template or at least one contour of the test chart 85. Upon determining the at least one slant edge, the control unit 70 estimates contrast variations in the at least one slant edge spread over the at least one region of the at least one image frame using Modulation Transfer Function (MTF), The contrast variations in the at least one slant edge identify a black and white transition in the at least one image frame. For example, when the contrast variation is less, the black and white transition in the at least one image frame may not be clear and when the contrast variation is high, the black and white transition in the at least one image may be clear and sharp. The contrast variations referred herein may be maximum contrast variations estimated in the at least one slant edge.

In accordance with the estimated maximum contrast variations in the at least one slant edge spread over the at least one region of the at least one image frame, the control unit 70 aligns the lens assembly 80 of the camera 100. Thus, the maximum contrast variations may be used to align/fix the lens assembly 80 at a distance, which provides a required minimum and maximum working distance of the camera 100.

Various embodiments describing aligning of the lens assembly 80 of the camera 100 are explained in conjunction with figures in later parts of the description.

Figure 2:
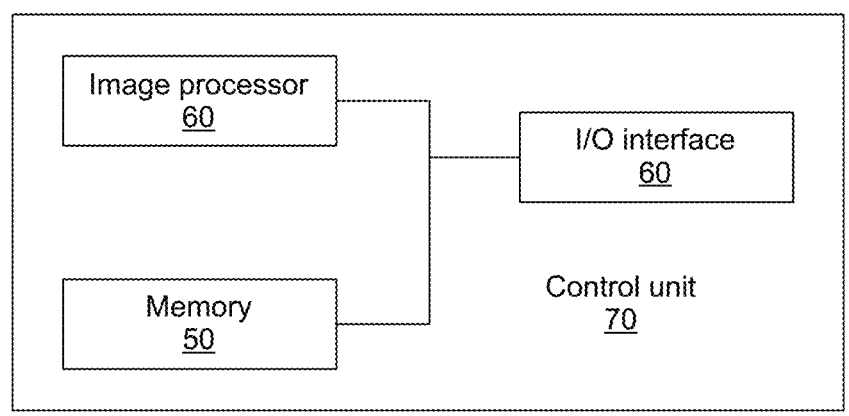
FIG. 2 shows components of a control unit configured for aligning a lens assembly of the camera, according to some embodiments.

FIG. 2 shows components of the control unit 70 configured for aligning the lens assembly 80 of the camera 100. As depicted in FIG. 2, the control unit 70 comprises an image processor 60, an I/O interface 55, and a memory 50.

The image processor 60 referred herein may comprise one or more processors configured to align the lens assembly 80 of the camera 100. In some examples, the image processor 60 may be embodied in or may include an integrated circuit, an application-specific integrated circuit (ASIC), a digital signal processor (DSP), a field programmable gate array (FPGA), a programmable logic controller (PLC), discrete hardware components, or any combination thereof. In some examples, the image processor 60 may be integrated into a single unit (for example, a single chipset or circuitry) that provides functionality in accordance with embodiments disclosed herein. The image processor 60 may execute one or more machine-accessible instructions, for example, computer-readable instructions and/or computer executable instructions, stored in the memory 50. The one or more machine-accessible instructions may embody or may include control logic for operation of the image processor 60 in accordance with embodiments disclosed herein.

For aligning the lens assembly of the camera 100, the image processor 60 obtains at least one image frame being captured by the camera 100. The at least one image frame may be captured by the camera 100 using the imaging element 90. The at least one image frame may be a representative of an image of the test chart 85. In some examples, each image frame may captured while the lens assembly 80 of the camera 100 is being adjusted and resolution of the camera 100 is set to a pre-defined resolution.

For obtaining the at least one image frame for further analysis, the image processor 60 may calculate a mean pixel values in the at least one image frame being captured by the camera 100. Upon calculating the mean pixel values, the image processor 60 may determine whether a mean of pixel values in the at least one image frame is greater than a pre-defined pixel threshold. In some examples, the mean of pixel values in the at least one image frame and the pre-defined pixel threshold may be calculated in accordance with a canny edge detection method. When the mean of pixel values in the at least one image frame is greater than the pre-defined pixel threshold, the image processor 60 may consider the at least one image frame as non-blur image and obtain the at least one image frame for further analysis. When the mean of pixel values in the at least one image frame is not greater than the pre-defined pixel threshold, the image processor 60 may consider the at least one image frame as blur image and reject the at least one image frame for further analysis.

Upon obtaining the at least one image frame (i.e., the non-bur image) for analysis, the image processor 60 determines at least one slant edge spread over at least one region of the at least one image frame by analyzing each image frame. The at least one slant edge herein defines a contrast of the at least one image frame.

For determining the at least one slant edge spread over the at least one region of the at least one image frame, the image processor 60 may identify at least one region of interest (ROI) in the at least one image frame by performing template matching or contour detection on each image frame. The at least one ROI in the at least one image frame may be a region of the at least one image frame comprising the at least one slant edge.

More specifically, for identifying the at least one ROI in the at least one image frame, the image processor 60 may determine whether a SFR plus chart or a SFR reg chart is selected based on a FOV of the lens assembly 80 for identifying the at least one ROI in the at least one image frame. In embodiments disclosed herein, the SFR plus chart may be a modified SFR plus chart. In some examples, the SFR plus chart may be selected for the lens assembly 80 with FOV regions visible to the camera 100, for example, ranging from 20 degrees to 120 degrees. The SFR reg chart may be selected for the lens assembly 80 with FOV regions visible to the camera 100, for example, ranging above 120 degrees.

When it has been determined that the SFR plus chart is selected, the image processor 60 may identify the at least one ROI in the at least one image frame by performing template matching. For identifying the at least one ROI in accordance with template matching, the image processor 60 selects a template representing at least one pattern being present in the SFR plus chart. The at least one patter may have a suitable geometrical shape. In some examples, the pattern may have a shape of star (focus star). Such a pattern may be positioned at a center of a slanted square grid present in the SFR plus chart. Upon selecting the template representing the at least one pattern, the image processor 60 may determine at least one location in the at least one image frame comprising the selected template. For example, the image processor 60 may detect a first location in the at least one image frame comprising the selected template. Upon detecting the first location, the image processor 60 may block an area around the first location for identifying at least one subsequent location in the at least one image frame comprising the selected template. Thus, multiple template detections at the same location may be avoided. The image processor 60 may identify the determined at least one image frame (comprising the selected template) as the least one ROI in the at least one image frame.

When it has been determined that the SFR reg chart is selected, the image processor 60 may identify the at least one ROI in the at least one image frame by performing contour detection. For identifying the at least one ROI in accordance with contour detection, the image processor 60 may detect at least one contour/shape in at least one location in the at least one image frame. The at least one contour may be present in the SFR reg chart. Upon detecting the at least one contour, the image processor 60 may fit a rectangle around the detected at least one contour and calculate a height and a width of the rectangle fitted around the at least one contour. The image processor 60 may then assign a contour threshold for the height and the width of the rectangle fitted around the at least one contour. The image processor 60 may identity the at least one location associated with the at least one contour as the at least one ROI in the at least one image frame, wherein the height and the width of the rectangle fitter around the at least one contour is greater than the contour threshold. The image processor 60 may reject the at least one contour when the height and the width of the rectangle fitted around the at least one contour is not greater than the contour threshold.

Thus, the identified ROI in the at least one image frame comprises the at least one pattern/template or the at least one contour of the test chart 85.

Upon identifying the at least one ROI in the at least one image frame, the image processor 60 may alter the identified at least one ROI. In some examples, the at least one ROI may be altered by cropping a size of the at least one ROI based on a curvature of the lens assembly of the camera 100. In some examples, the at least one ROI may be altered by rotating the at least one ROI for a vertical alignment, when the at least one ROI is a horizontal ROI. Thereby, converting the horizontal ROI to a vertical ROI.

After altering the identified at least one ROI, the image processor 60 determines the at least one slant edge spread over the altered at least one ROI in the at least one image frame by cancelling the noise in the altered at least one ROI. In some examples, the image processor 60 may cancel the noise in the altered at least one ROI using a bilateral filter. In some examples, the noise may be determined as an edge point that is far away from the at least one slant edge. In some examples, the image processor 60 may determine the at least one slant edge using edge detection methods like, but not limited to, a sobel edge detection method.

Thus, the at least one slant edge in the at least one image frame may be automatically detected, which makes aligning of the lens assembly faster without missing the image frames while rotation of the lens assembly. Also, the image processor 60 may re-correct if there is any deviation in detection of the at least one slant edge. As a result, a manual interpretation is not necessary.

Once the at least one slant edge spread over the at least one region in the at least one image frame is determined, the image processor 60 estimates the contrast variations in the at least one slant edge using MTF. The contrast variations in the at least one slant edge identify a black and white transition in the at least one image frame. The contrast variations referred herein may be maximum contrast variations estimated in the at least one slant edge.

For estimating the contrast variations in the at least one slant edge, the image processor 60 may fit the at least one slant edge spread over the at least one region of the at least one image frame as a straight edge. In some examples, fitting the at least one slant edge may involve fitting the at least one slant edge to a first order, thereby correcting the at least one slant/coarse edge Upon fitting the at least one slant edge to the straight edge, the image processor 60 may calculate an Edge Spread Function (ESF) by projecting edge points horizontally. The edge points represent a pixel value in the at least one slant edge. The image processor 60 may then derive a Line Spread Function (LSF) by determining a difference of the edge points in the ESF. The ESF and the LSF may be easily understood by referring to already available details related to the ESF and the LSF, therefore the ESF and the LSF are not described in detail herein. After calculating the ESF and deriving the LSF, the image processor 60 may apply a Discrete Fourier Transform (DFT) on the LSF. The magnitude of the DFT may represent a MTF value. The image processor 60 may calculate the MTF value to a maximum MTF, which represents the contrast variations (i.e., the maximum contrast variations) in the at least one slant edge spread over the at least one region of the at least one image frame.

In some embodiments, the image processor 60 may calculate the MTF value to the maximum MTF by rotating the lens assembly 80 of the camera 100 in a clockwise direction to enable the MTF value to achieve the maximum MTF from a lower value. When the MTF value decreases from the maximum MTF, the image processor 60 may rotate the lens assembly 80 in a counter-clockwise direction till the MTF value is computed to the maximum MTF achieved during the rotation of the lens assembly 80 of the camera 100 in the clockwise direction.

In accordance with the estimated maximum contrast variations in the at least one slant edge, the image processor 60 aligns the lens assembly 80 of the camera 100, while achieving a minimum and maximum working distance known as a focus range of the camera 100.

Thus, the lens assembly 80 camera 100 may be aligned/fixed only when all the region's MTF is in optimal value.

The I/O interface 55 may be configured to enable communication between the control unit 70/image processor 60 of the control unit 70 and one or more electronic or electromechanical devices, which may be used to align the lens assembly 80 of the camera 100. In some examples, the I/O interface 55 may include one or more display units that enable an operator to control operation of the camera 100/control unit 70 or provide information about operations of the camera 100/control unit 70 (for example, an image frame captured by the camera 100, information associated with the image frame, or the like).

Figure 3:
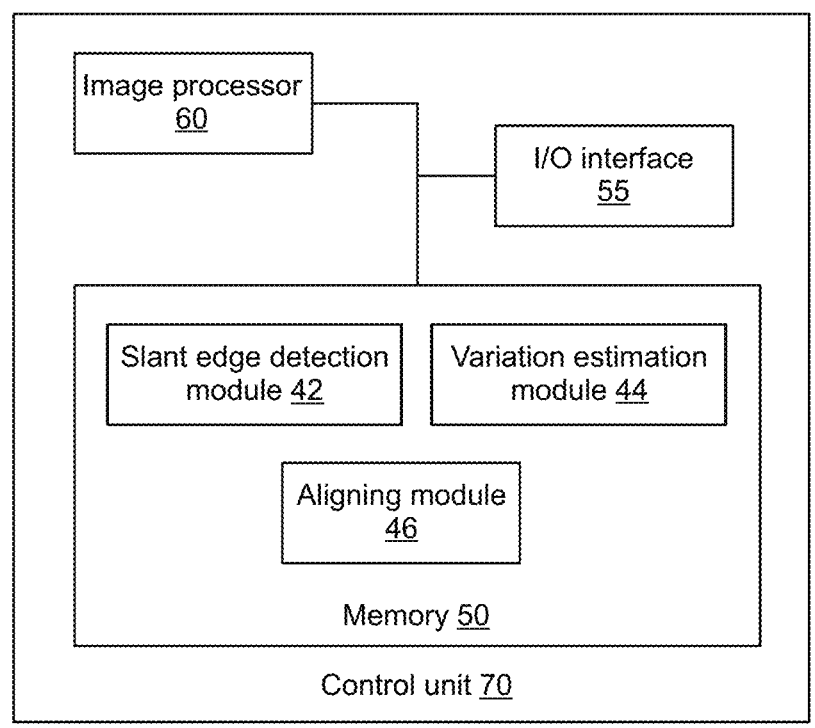
FIG. 3 discloses functional modules being executed by an image processor to align the lens assembly of a camera, according to some embodiments.

FIG. 3 discloses functional modules being executed by the image processor 60 to align the lens assembly 80 of the camera 100. As depicted in FIG. 3, the memory 50 comprises one or more computer-accessible instructions that represent a software component, which may be assembled into one or more program modules such as, a slant edge detection module 42, a variation estimation module 44, and an aligning module 46. Such modules may be executed by the image processor 60 to align the lens assembly 80 of the camera 100.

The slant edge detection module 42 may be configured to determine the at least one slant edge spread over at least one region of the at least one image frame. The at least one slant edge defines the contrast of the at least one image frame.

The variation estimation module 44 may be configured to estimate the contrast variations in the at least one slant edge spread over the at least one region of the at least one image frame using MTF. The contrast variations identify black and white variations in the at least one image frame.

The aligning module 46 may be configured to align the lens assembly 80 of the camera 100 in accordance with the estimated contrast variations in the at least one slant edge spread over the at least one region of the at least one image frame.

Figure 4:
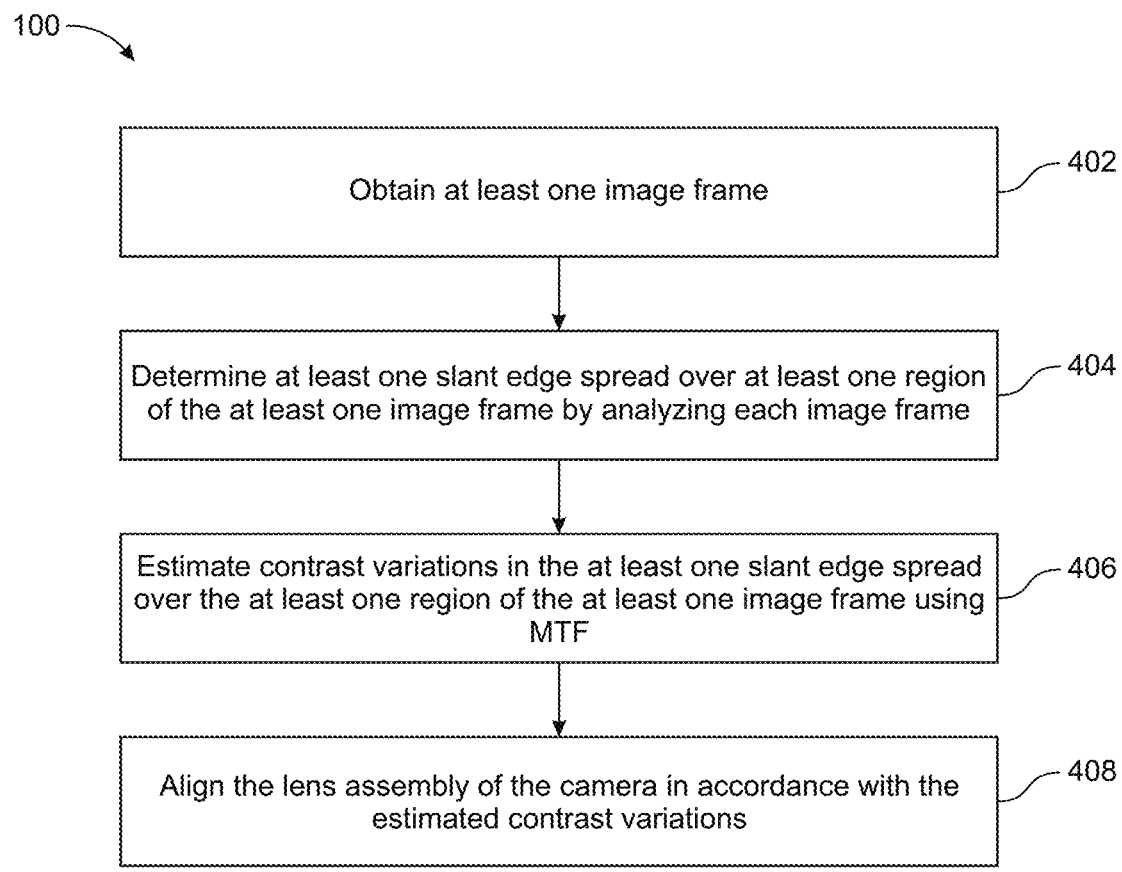
FIG. 4 is a flowchart illustrating example method steps of a method performed by an image processor in a control unit of a camera, according to some embodiments.

FIG. 4 is a flowchart illustrating example method steps of a method 400 performed by the image processor 60 in the control unit 70 of the camera 100.

At step 402, the method 400 comprises obtaining the at least one image frame being captured by the camera. The obtained at least one image frame may be non-blur image. The image frame may be representative of an image of the test chart 85.

At step 404, the method 400 comprises determining at least one slant edge spread over at least one region of the at least one image frame by analyzing each image frame. The at least one slant edge defines a contrast of the at least one image frame and the at least one region being comprising at least one template or at least one contour of the test chart 85.

In some embodiments, for determining the at least one slant edge, the method comprises identifying at least one ROI in the at least one image frame by performing template matching or contour detection on each image frame. The at least one ROI in the at least one image frame may be the region of the at least one image frame comprising the at least one slant edge. Upon identifying the at least one ROI, the method comprises altering the identifying at least one ROI in the at least one image frame and determining the at least one slant edge spread over the altered at least one ROI in the at least one image frame.

At step 406, the method 400 comprises estimating the contrast variations in the at least one slant edge spread over the at least one region of the at least one image frame using MTF. The contrast variations in the at least one slant edge identify the black and white transition in the at least one image frame. In some embodiments, for estimating the contrast variations in the at least one slant edge, the method comprises fitting the at least one slant edge spread over the at least one region of the at least one image frame as a straight edge. The method comprises calculating an ESF by projecting edge points horizontally, wherein the edge points represent a pixel value in the at least one slant edge and deriving a Line Spread Function (LSF) by determining a difference of the edge points in the ESF. Thereafter, the method comprises applying a DFT on the LSF, wherein a magnitude of the DFT represents a MTF value. The method further comprises calculating the MTF value to a maximum MTF, wherein the maximum MTF represents the contrast variations in the at least one slant edge spread over the at least one region of the at least one image frame.

In some embodiments, the step of calculating the MTF value to the maximum MTF comprises rotating the lens assembly 80 of the camera 100 in a clockwise direction to enable the MTF value to achieve the maximum MTF from a lower value. When the MTF value decreases from the maximum MTF, the method comprises rotating the lens assembly 80 in a counter-clockwise direction till the MTF value is computed to the maximum MTF achieved during the rotation of the lens assembly 80 of the camera 100 in the clockwise direction.

At step 408, the method 400 comprises aligning the lens assembly 80 of the camera 100 in accordance with the contrast variations estimated in the at least slant edge.

Figure 5:
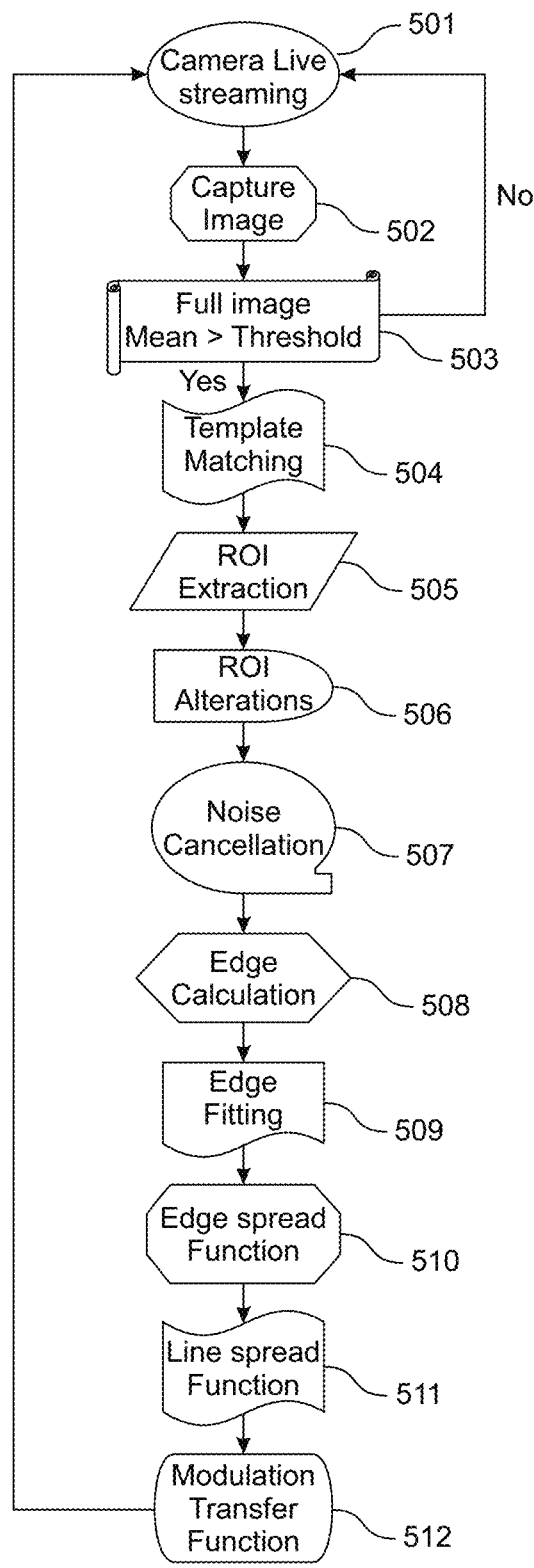
FIG. 5 is an example flowchart illustrating method steps performed for estimating contrast variations in at least one slant edge spread over at least one region of the at least one image frame, according to some embodiments.

FIG. 5 is an example flowchart illustrating method steps performed for estimating contrast variations in at least one slant edge spread over at least one region of the at least one image frame.

At step 501, the camera 100 is operated to capture image frames in a real-time. At step 502, the camera 100 captures at least one image frame. At step 503, the image processor 60 in the control unit 70 of the camera 100, which is coupled to the lens assembly 80 decides to consider the at least one image frame for further analysis. The image processor 60 determines whether the mean of pixel values in the at least one image frame is greater than the pre-defined pixel threshold. If the mean of pixel values in the at least one image frame is not greater than the pre-defined pixel threshold, the image processor 60 considers the at least one image frame as a non-blur image and repeats from step 501. If the mean of pixel values in the at least one image frame is not greater than the pre-defined pixel threshold, the image processor 60 considers the at least one image frame as the non-blur image for further analysis.

Figure 6A:
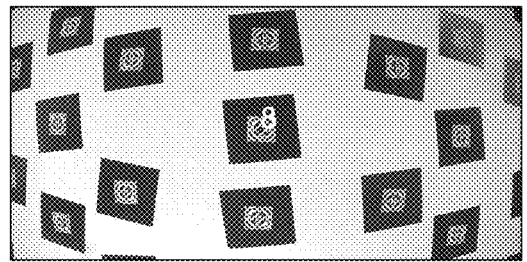
FIGS. 6A, 6B, 6C and 6D show template matching performed for identifying at least one region of interest (ROI) in an image frame, according to some embodiments.
Figure 6B:
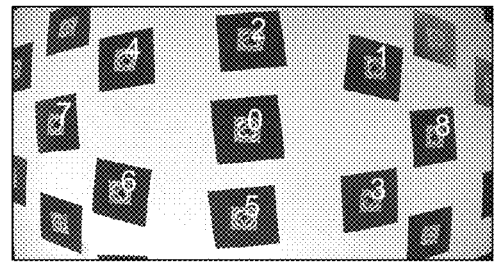
Figure 6C:
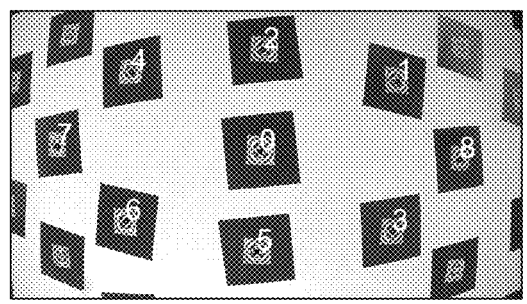
Figure 6D:
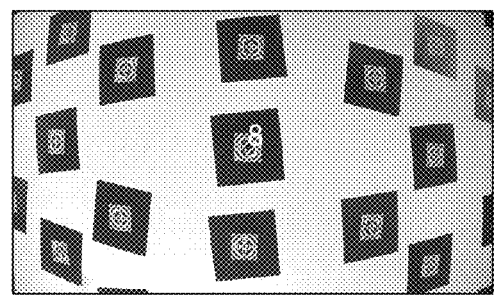

At step 504, the image processor 60 performs template matching or contour detection. Template matching performed using the SFR plus chart is depicted in FIGS. 6A, 6B, 6C, and 6D. Template matching for the lens assembly 80 with a narrow angle is depicted in FIGS. 6A and 6B. Template matching for the lens assembly 80 with a wide angle is depicted in FIGS. 6C and 6D. For performing template matching, the image processor 60 selects a template based on a FOV of the lens assembly 80. In an example herein, the template comprises a pattern positioned at a center of a square grid in the SFR plus chart. The pattern may have a star shape. On selecting the template, the image processor 60 determines the at least one location in the at least one image frame comprising the selected template. At least one location in the image frame comprising the selected/correct template is depicted in FIGS. 6A and 6C. A location in the image frame comprising wrong template is depicted in FIGS. 6B and 6D.

Contour detection performed using the SFR reg chart is depicted in FIGS. 7A and 7B. Contour detection involves detecting necessary contours/shapes in the at least one image frame. For contour detection, the image processor 60 detects at least one contour in at least one location in the at least one image frame. The detected contour may be present in the SFR reg chart. On detecting the at least one contour, the image processor 60 fits a rectangle around the detected at least one contour and calculates height and width of the rectangle fitted around the at least one contour. The image processor 60 assigns a contour threshold for the height and the width of the rectangle fitted around the at least one contour. Thereafter, the image processor 60 determines the necessary contours based on the contour threshold. For example, the image frame with all the contours is depicted in FIG. 7A. An unwanted contour (that is the height and the width of the rectangle fitted around the at least one contour is not greater than the contour threshold) is indicated in FIG. 7A. The necessary contours (that is the height and the width of the rectangle fitted around the contours is greater than the contour threshold) are indicated in FIG. 7B.

At step 505, the image processor 60 identifies/extracts the at least one ROI in the at least one image frame based on template matching or contour detection. For example, the ROI may be the at least one location comprising the selected template or the necessary contour.

At step 506, the image processor 60 alters the extracted at least one ROI by cropping a size of the at least one ROI and/or rotating the at least one ROI for a vertical alignment when the at least one ROI is a horizontal ROI. Cropping of the at least one ROI is depicted in FIGS. 8A and 8B. Cropping of the ROI in the image frame in accordance with a curvature of the lens assembly 80 of the camera 100 is depicted in FIG. 8A. As depicted in FIG. 8A, cropping of the ROI includes reducing a size of the ROI from a centre to side based on the curvature percentage. An incorrect cropping of the ROI is depicted in FIG. 8B. Since the FOV is wider in the image frame depicted in FIG. 8B, cropping of the ROI may not be same all over the image as in the narrow angle lens.

At step 507, the image processor 60 cancels the noise in the altered at least one ROI, for example, using a bilateral filter. In some examples, an edge point that is far away from the slant edge may be detected as noise. Upon noise cancellation, at step 508, the image processor 60 determines the at least one slant edge spread over the altered at least one ROI using suitable edge detection methods. For example, a slant edge determined in the image frame is depicted in FIG. 9.

At step 509, the image processor 60 fits the at least one slant edge as a straight edge/line, since the identified slant edge in the ROI is not perfect due to noise. Fitting the slant edge as the straight line is depicted in FIGS. 10A and 10B.

At step 510, the image processor 60 calculates an ESF by projecting edge points horizontally, wherein the edge points represent a pixel value in the at least one slant edge. At step 511, the image processor 60 derives a LSF by determining a difference of the edge points in the ESF.

At step 512, the image processor 60 applies DFT on the LSF, wherein a magnitude of the DFT represents a MTF value. The image processor 60 calculates the MTF value to the maximum MTF. The maximum MTF represents the maximum contrast variations in the at least one slant edge spread over the at least one region of the at least one image frame. In accordance with the maximum MTF, the image processor 60 may align the lens assembly of the camera 100.

It should be noted that steps from 501 to 512 (except step 504) may be repeated until obtaining the maximum MTF.

Thus, aligning the lens assembly 80 of the camera 100 in accordance with the above-described steps may reduce processing time. For example, the ROI comprising the at least one slant edge may be extracted in 100 milliseconds and the MTF of 32 regions may be calculated in 35 milliseconds. Thus, overall processing time may be reduced.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors, DSPs, special-purpose digital logic, and the like. The processing circuitry may be configured to execute program code stored in memory, which may include one or several types of memory such as read-only memory (ROM), random-access memory, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

Figure 11:
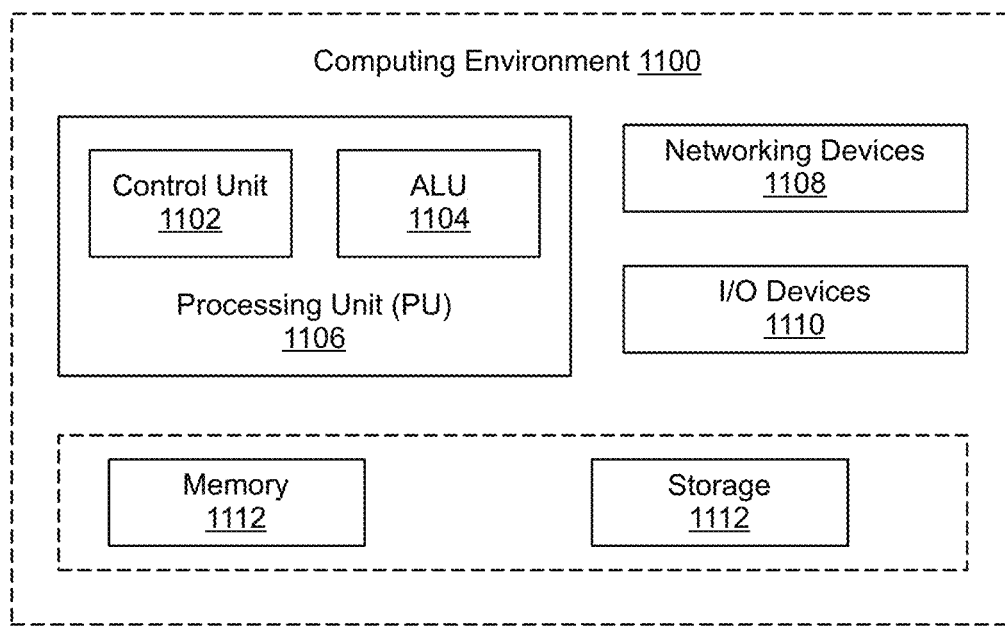
FIG. 11 shows an example computing environment, according to some embodiments.

FIG. 11 illustrates an example computing environment 1100 implementing a method and the image processor 60 as described in FIG. 4. As depicted in FIG. 11, the computing environment 1100 comprises at least one data processing module 1106 that is equipped with a control module 1102 and an Arithmetic Logic Unit (ALU) 1104, a plurality of networking devices 1108 and a plurality Input output, I/O devices 1110, a memory 1112, a storage 1114. The data processing module 1106 may be responsible for implementing the method described in FIG. 4. For example, the data processing module 1106 may in some embodiments be equivalent to the image processor 60 described above in conjunction with FIGS. 2 and 3. The data processing module 1106 is capable of executing software instructions stored in memory 1112. The data processing module 1106 receives commands from the control module 1102 in order to perform its processing. Further, any logical and arithmetic operations involved in the execution of the instructions are computed with the help of the ALU 1104.

The computer program is loadable into the data processing module 1106, which may, for example, be comprised in an electronic apparatus (such as a camera 100). When loaded into the data processing module 1106, the computer program may be stored in the memory 1112 associated with or comprised in the data processing module 1106. According to some embodiments, the computer program may, when loaded into and run by the data processing module 1106, cause execution of method steps according to, for example, the method illustrated in FIG. 4 or otherwise described herein.

The overall computing environment 1100 may be composed of multiple homogeneous and/or heterogeneous cores, multiple CPUs of different kinds, special media and other accelerators. Further, the plurality of data processing modules 1106 may be located on a single chip or over multiple chips.

The algorithm comprising of instructions and codes required for the implementation are stored in either the memory 1112 or the storage 1114 or both. At the time of execution, the instructions may be fetched from the corresponding memory 1112 and/or storage 1114, and executed by the data processing module 1106.

In case of any hardware implementations various networking devices 1108 or external I/O devices 1110 may be connected to the computing environment to support the implementation through the networking devices 1108 and the I/O devices 1110.

The embodiments disclosed herein can be implemented through at least one software program running on at least one hardware device and performing network management functions to control the elements. The elements shown in FIG. 11 include blocks which can be at least one of a hardware device, or a combination of hardware device and software module.

What is claimed is:

1. A method for aligning a lens assembly of a camera, the method comprising:
obtaining, by an image processor, at least one image frame being captured by the camera;
determining, by the image processor, at least one slant edge spread over at least one region of the at least one image frame by analyzing each image frame, wherein the at least one slant edge defines a contrast of the at least one image frame and the at least one region being comprising at least one template or at least one contour of a test chart;
estimating, by the image processor, contrast variations in the at least one slant edge spread over the at least one region of the at least one image frame using Modulation Transfer Function (MTF), wherein the contrast variations in the at least one slant edge identify a black and white transition in the at least one image frame; and aligning, by the image processor, the lens assembly of the camera in accordance with the estimated contrast variations in the at least one slant edge spread over the at least one region of the at least one image frame.

2. The method according to claim 1, wherein each image frame is captured while the lens assembly of the camera is being adjusted and a resolution of the camera is set to a pre-defined resolution.

3. The method according to claim 1, wherein obtaining the at least one image frame comprises:

calculating a mean of pixel values in the at least one image frame being captured by the camera;

determining whether the mean of pixel values in the at least one image frame is greater than a pre-defined pixel threshold; and obtaining the at least one image frame, when the mean of pixel values in the at least one image frame is greater than the pre-defined pixel threshold.

4. The method according to claim 3, further comprising: rejecting the at least one image frame, when the mean of pixel values in the at least one image frame is not greater than the pre-defined pixel threshold.

5. The method according to claim 1, wherein determining the at least one slant edge spread over the at least one region of the at least one image frame comprises:

identifying at least one region of interest (ROI) in the at least one image frame by performing template matching or contour detection on each image frame, wherein the at least one ROI in the at least one image frame is the region of the at least one image frame comprising the at least one slant edge;

altering the identified at least one ROI in the at least one image frame; and determining the at least one slant edge spread over the altered at least one ROI in the at least one image frame.

6. The method according to claim 5, wherein identifying the at least one ROI in the at least one image frame by performing template matching or contour detection comprises:

determining whether a Spatial Frequency Response (SFR) plus chart or a SFR reg chart is selected based on a field of view (FOV) of the lens assembly for identifying the at least one ROI in the at least one image frame, wherein the SFR plus chart or the SFR reg chart is the test chart; and when it has been determined that the SFR plus chart is selected, identifying the at least one ROI in the at least one image frame by performing template matching.

7. The method according to claim 6, further comprising: when it has been determined that the SFR reg chart is selected, identifying the at least one ROI in the at least one image frame by performing contour detection.

8. The method according to claim 6, wherein identifying the at least one ROI in the at least one image frame by performing template matching comprises:

selecting a template representing at least one pattern being present in the SFR plus chart;

determining at least one location in the at least one image frame comprising the selected template; and identifying the determined at least one location in the at least one image frame as the at least one ROI in the at least one image frame.

9. The method according to claim 8, wherein determining the at least one location in the at least one image frame comprising the selected template comprises:

detecting a first location in the at least one image frame comprising the selected template; and blocking an area around the first location for identifying at least one subsequent location in the at least one image frame comprising the selected template.

10. The method according to claim 7, wherein identifying the at least one ROI in the at least one image frame by performing contour detection comprises:

detecting at least one contour in at least one location in the at least one image frame, wherein the at least one contour is being present in the SFR reg chart;

fitting a rectangle around the detected at least one contour;

calculating a height and a width of the rectangle fitted around the at least one contour;

assigning a contour threshold for the height and the width of the rectangle fitted around the at least one contour; and identifying the at least one location associated with the at least one contour as the at least one ROI in the at least one image frame, when the height and the width of the rectangle fitted around the at least one contour is greater than the contour threshold.

11. The method according to claim 10, further comprising:

rejecting the at least one contour when the height and the width of the rectangle fitted around the at least one contour is not greater than the contour threshold.

12. The method according to claim 5, wherein altering the at least one ROI in the at least one image frame comprises one or more of:

cropping a size of the at least one ROI based on a curvature of the lens assembly of the camera; and rotating the at least one ROI for a vertical alignment, when the at least one ROI is a horizontal ROI.

13. The method according to claim 5, determining the at least one slant edge spread over the altered at least one ROI in the at least one image frame comprises:

cancelling the noise in the altered at least one ROI; and determining the at least one slant edge spread over the altered at least one ROI.

14. The method according to claim 1, wherein estimating the contrast variations in the at least one slant edge using MTF comprises:

fitting the at least one slant edge spread over the at least one region of the at least one image frame as a straight edge;

calculating an Edge Spread Function (ESF) by projecting edge points horizontally, wherein the edge points represent a pixel value in the at least one slant edge;

deriving a Line Spread Function (LSF) by determining a difference of the edge points in the ESF; and applying a Discrete Fourier Transform (DFT) on the LSF, wherein a magnitude of the DFT represents a MTF value.

15. The method according to claim 14, further comprising:

calculating the MTF value to a maximum MTF, wherein the maximum MTF represents the contrast variations in the at least one slant edge spread over the at least one region of the at least one image frame.

16. The method according to claim 15, wherein calculating the MTF value to the maximum MTF comprises:

rotating the lens assembly of the camera in a clockwise direction to enable the MTF value to achieve the maximum MTF from a lower value; and when the MTF value decreases from the maximum MTF, rotating the lens assembly of the camera in a counter-clockwise direction till the MTF value is computed to the maximum MTF achieved during rotation of the lens assembly of the camera in the clockwise direction.

17. The method according to claim 1, wherein aligning the lens assembly of the camera comprises:

aligning the lens assembly of the camera while achieving a minimum and maximum focus range of the camera.

18. A camera comprising:

a lens assembly;

an imaging element configured to be coupled to the lens assembly for capturing at least one image; and an image processor configured to be coupled to the lens assembly for:

obtaining at least one image frame;

determining at least one slant edge spread over at least one region of the at least one image frame by analyzing each image frame, wherein the at least one slant edge defines a contrast of the at least one image frame and the at least one region being comprising at least one template or at least one contour of a test chart;

estimating contrast variations in the at least one slant edge spread over the at least one region of the at least one image frame using Modulation Transfer Function (MTF), wherein the contrast variations in the at least one slant edge identify a black and white transition in the at least one image frame; and aligning the lens assembly of the camera in accordance with the estimated contrast variations in the at least one slant edge spread over the at least one region of the at least one image frame.

19. A computer program product comprising a non-transitory computer readable medium, having thereon a computer program comprising program instructions, the computer program being loadable into a data processing unit and configured to cause execution of the method according to claim 1 when the computer program is run by the data processing unit.

* * * * *